P. R. MAHONEY & W. R. KRUEGER.
SANDING DEVICE FOR AUTOVEHICLES.
APPLICATION FILED MAY 10, 1918.
1,294,929.
Patented Feb. 18, 1919.
2 SHEETS—SHEET 2.
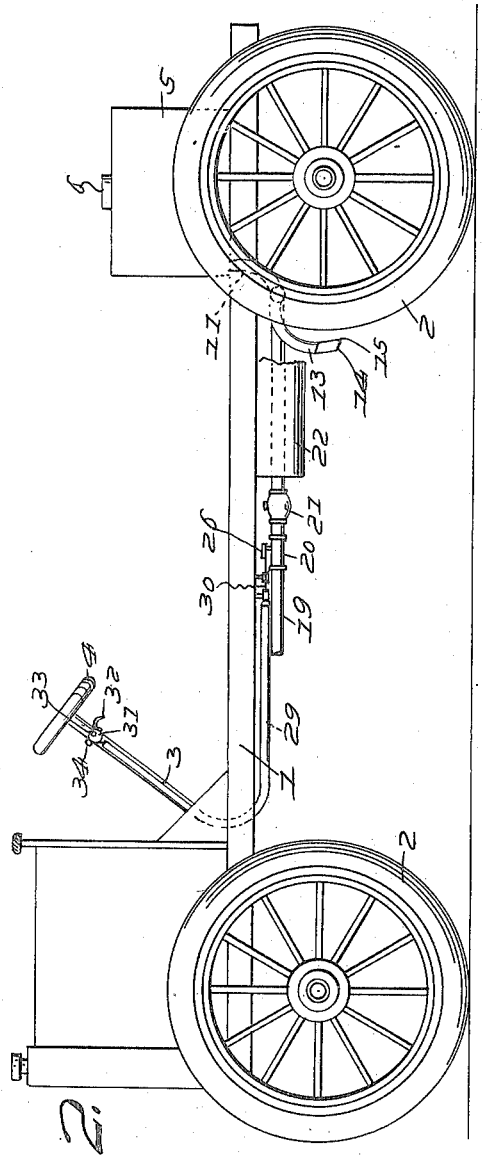
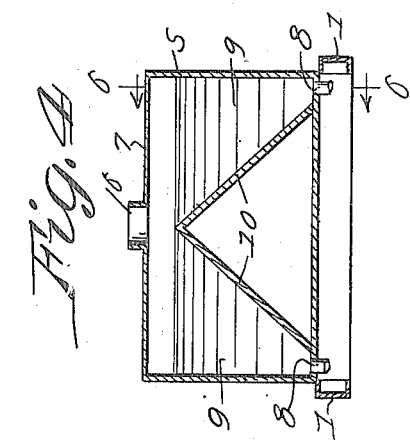
Inventors
Percy R. Mahoney
and Walter R. Krueger,
By
E. Hume Talbert
Attorney

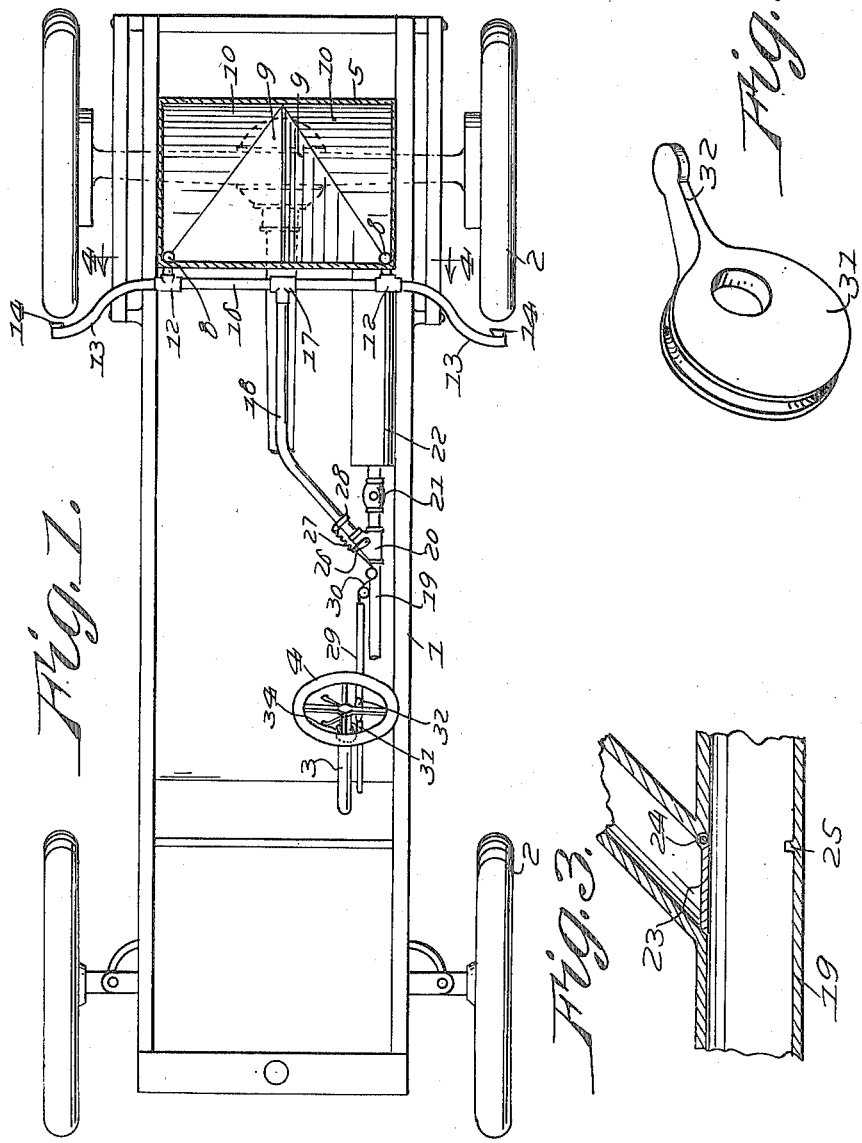

UNITED STATES PATENT OFFICE.

PERCY R. MAHONEY AND WALTER R. KRUEGER, OF PORTLAND, OREGON.

SANDING DEVICE FOR AUTOVEHICLES.

1,294,929.  Specification of Letters Patent.  Patented Feb. 18, 1919.

Application filed May 10, 1918. Serial No. 233,736.

*To all whom it may concern:*

Be it known that we, PERCY R. MAHONEY and WALTER R. KRUEGER, citizens of the United States of America, residing at Portland, in the county of Multnomah and State of Oregon, have invented new and useful Improvements in Sanding Devices for Autovehicles, of which the following is a specification.

The invention relates to sanding devices for auto vehicles and seeks to provide as its principal object, an improved device whereby sand may be discharged at any time upon the tires of the traction wheels and upon the traction surface directly in front of the wheels, thereby preventing slipping and skidding.

A further object of the invention is the provision of a sanding device for auto vehicles so arranged that the exhaust of the vehicle engine may be automatically diverted from the muffler into mechanism connected with a sand reservoir thereby causing the sand to be ejected onto the wheels and onto the traction surface directly in front of the wheels.

A still further object of the invention is to provide means for attachment to the steering column at a point adjacent the steering wheel, whereby the engine exhaust may be conveniently diverted from the muffler into the sanding device and vice versa.

A still further object is to provide a device of this character which is simple in construction, durable and effective in operation and which can be manufactured and applied to auto vehicles at small cost.

Other and further objects will appear as the invention is set forth in detail in the description which follows.

In the accompanying drawings, the invention is illustrated in a specific form to which it is not to be restricted. Actual practical application may show certain desirable changes or alterations to be of advantage and the right is claimed to make any such changes or alterations that do not deviate from the scope of the subjoined claims.

The same numerals of reference designate the same parts through the several figures of the drawings, wherein:

Figure 1 is a top plan view of an auto vehicle running gear and its attendant chassis.

Fig. 2 is a side elevation of the structure shown in Fig. 1.

Fig. 3 is a detail sectional view through the valve used for diverting the exhaust from the muffler into the sanding device.

Fig. 4 is a section on the line 4—4 of Fig. 1.

Fig. 5 is a perspective view of the member carried on the steering column for operating the valve designed to divert the exhaust from the muffler into the sanding mechanism.

Fig. 6 is a section on the line 6—6 of Fig. 4.

Referring to the drawings, there is shown a conventional form of auto vehicle having a chassis 1, the traction wheels 2, the steering column 3 and the steering wheel 4 all of which are made and assembled in the usual way.

On the rear end of the chassis and positioned so that it will stand below the rear seat of the vehicle body when the latter is secured to the chassis, there is a box or reservoir 5 which is designed to hold sand or some other gritty material which, when applied to the treads of the wheels and to the surface over which the wheels pass, will give to both a high coefficient of friction.

The box or reservoir 5 is preferably in the form of a rectangular parallelepiped having an opening 6 positioned centrally in its top 7, this opening being for the purpose of supplying the box with sand. At the bottom of the forward end of the box and positioned adjacent each of its two sides, there are apertures or openings 8 through which the sand or frictional material is designed to pass when leaving the box. The bottom of the box is arranged so as to direct the sand or frictional material toward these openings, this arrangement comprising triangular bottom plates 9 and 10. The box is provided with two of each of these plates and they are assembled in pairs consisting of one plate 9 and one plate 10. The two plates are in the shape of right angle triangles and they are joined together on the sides which constitute the hypotenuses of the triangles. The straight sides of the plate 10 are attached to the sides of the box and to the back thereof, while one straight side of the plate 9 is attached to the front of the box. The other straight sides of the two plates 9 are joined together. The particular arrangement of each pair of plates 9 and 10 results in the formation of the chutes which have their rear ends adjacent and obtaining at the back of the box, where the chutes have their highest points. The forward ends of the chutes connect with the openings 8. Thus any sand or gritty substance which is placed into the box 5 finds its way by gravity to the openings 8.

On the undersurface of the box 5 elbows 11 are provided which connect with the openings 8 and these elbows terminate in T's 12 to each of which a tube 13 is attached. Both the tubes 13 pass from the T's 12 over in front of the treads of the wheels 2 where they terminate in nozzles 14 having outlets 15 through which sand or other gritty material is ejected and blown onto the treads of the wheels and onto the traction surface in front of the wheels. The two T's 12 are interconnected by a pipe 16 which carries a T 17 at its center, the leg of this T 17 receiving a second pipe 18 which is connected with the exhaust pipe 19 leading from the vehicle engine by means of the Y-fitting 20.

The exhaust pipe 19 carries the usual flap valve 21 between the Y-fitting 20 and the muffler 22.

The Y-fitting 20 forms a housing for the flap valve 23 which is carried on a stem 24 that is pivotally mounted in the Y-fitting 20 at the junction of the leg with the body of the fitting. This flap valve 23 is designed to close communication between the exhaust pipe 19 and the pipe 18 or between the exhaust pipe 19 and the muffler 22, the fitting being provided with a projection 25 carried on its interior against which the valve 23 abuts when closing communication between the exhaust valve 19 and the muffler.

To keep the flap valve 23 normally in a position where it closes communication between the exhaust pipe 19 and the pipe 18, a lever 26 is attached to the valve stem 24 on the outside of the fitting 20 and this lever 26 has attached to its free end one end of the spring 27 the remaining end of which is suitably connected to the strap 28 attached on the pipe 18 near the point where it enters the fitting 20.

The valve 23 is designed to be operated from the steering column and to that end a tubular member 29 is provided which lies beside the steering column and passes down through the dash, curving back underneath the chassis of the machine where it terminates in the vicinity of the fitting 20. This tubular member is designed to be attached and held in position in any suitable manner and it is made preferably of material which may be bent to the proper shape after having been inserted through the dash. This tubing 29 is designed as a shield and guide for a cable 30 one end of which is attached to the free end of the lever 26, the other end of the cable, after the latter has been passed through the tube 29 being secured on the periphery of an eccentric member 31 adjacent the point where the operating handle 32 of the eccentric member connects with the latter. The eccentric member 31 is pivotally mounted on a stud 33 carried by a strap member 34 which is attached to the column 3 just below the steering wheel 4. The eccentric member 31 is grooved on its periphery, so that the cable 30 may lie therein when the eccentric member is moved by its handle 32. In this normal position of the eccentric member 31 and handle 32, the spring 27 of the valve 23 holds the latter in the position of closing the pipe 18. When the handle 32 is depressed, however, the cable 30 is drawn through the tube 29 and that portion of the cable which is drawn out of the upper end of the tube lies in the groove in the periphery of the eccentric member 31. Thus the lever 26 is moved and with it the valve 23 against the tension of the spring 27, the valve 23 being brought over against the projection 25, thereby closing communication between the exhaust tube 19 and the muffler 22 and opening communication between the former tube and the pipe 18.

It will be observed that the sanding device is held normally inoperative by the spring 27 which holds the valve 23 in the position of closing communication with the pipe 18 and which also holds the handle 32 in its normal position. In this position of the valve 23, the exhaust from the engine passes into the tube 19 and thence into the muffler 22. In the event that it is desired to put the sanding device in operation to prevent skidding, it is only necessary to depress the handle 32, thus diverting the exhaust into the pipe 18 from which is passes through the pipe 16 and thence into the tubes 13, ejecting ahead of it the sand and grit which is forced by gravity into the T's 12 through the openings 8 and elbows 11 the sand passing with the exhaust out through the openings 15 of the nozzles 14 by which it is distributed on the treads of the wheels and onto the traction surface just below the wheels.

The foregoing description taken in conjunction with the accompanying drawings makes further description of the device unnecessary.

The invention having been described, what is claimed as new and useful is:

In a device of the kind set forth, the combination, with an auto vehicle having a chassis, driving wheels and a steering column, of a sand box positioned on the rear of the chassis, discharge tubes connected with the box and projecting in front of the driving wheels, pipe connections between said discharge tubes and the exhaust tubes of the vehicle engine, a flap valve, said valve being designed for attachment in the engine exhaust tube and having communication with the said pipe connections, means for holding said valve in the position of closing the said pipe connections, a tubular member standing beside the steering column and extending close to said butterfly valve, a depressible member on the steering column above said tube, and a cable connecting said depressible member and said valve, the cable being contained within the tube.

In testimony whereof we affix our signatures.

PERCY R. MAHONEY.
WALTER R. KRUEGER.